United States Patent Office 2,894,953
Patented July 14, 1959

2,894,953

PROCESS FOR THE PRODUCTION OF PYRIDINE DERIVATIVE

Yoshinobu Sato and Hiroshi Mishima, Nishishinagawa, Shinagawa-ku, Tokyo-to, Japan, assignors to Sankyo Company, Ltd., Tokyo-to, Japan No Drawing. Application November 20, 1956
Serial No. 623,280

Claims priority, application Japan December 16, 1955

2 Claims. (Cl. 260—295.5)

This invention relates to a process for the production of compound which is useful as intermediate for the production of therapeutically valuable compounds and is represented by the formula

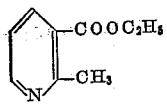
(I)

Hitherto, for the production of the compound as described above, the following processes have been proposed.

(A) A process which comprises reacting β-ethoxyacroleindiethyl acetal with ethyl β-aminocrotonate to produce pyridine derivative represented by the Formula I.

This process was described in B. 82, 216, (1949).

(B) A process which comprises using ethyl acetoacetate and diethyl aminomethylene malonate to produce the product represented by the Formula I.

This process was described in B. 74, 1111, (1941).

However, β-ethoxyacroleindiethyl acetal which is a starting substance in the process (A) should be produced from acrolein. The process (A) can not be used in an industrial scale, because the yield of β-ethoxyacrolein-diethyl acetal from acrolein is about only 30%. On the other hand, according to the process (B), only so small an amount of the pyridine derivative can be produced that industrial production thereof is impossible.

An essential object of this invention is to provide a process capable of industrially producing the compound represented by the Formula I.

The present inventors have found that the compound represented by the Formula I can be obtained directly with high yield by using acrolein as the starting substance.

According to this invention; acrolein is first reacted with the compound represented by the Formula II in an absolute alcohol, or in the presence of a catalyst of piperidine

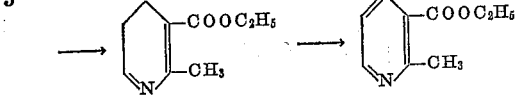
(II)

whereby a mixture of a dihydro-compound represented by the Formula III and the compound represented by the Formula I, as above identified, is produced.

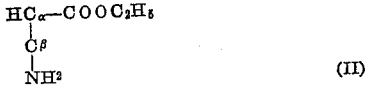
(III)

Then the mixture obtained as above is directly oxidized with sodium nitrate and sulfuric acid or only the dihydro-compound separated from the mixture is oxidized with sodium nitrate and sulfuric acid whereby the compound represented by the Formula I is obtained.

The reaction of the process of this invention is as follows.

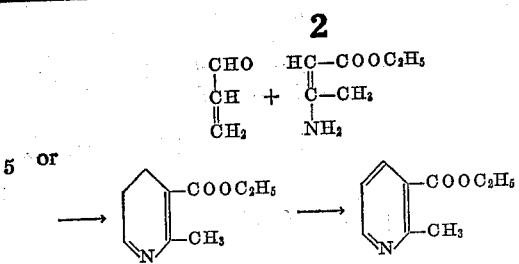

Particularly, this invention can be preferably carried out by reacting acrolein with the compound represented by the Formula II in an absolute alcohol in the presence of piperidine and then subjecting the thus obtained mixture of the compounds represented by the general Formulas I and III to oxidation by using sodium nitrate and sulfuric acid without separation of dihydro-compound from the reaction mixture.

Example I 129 g. (1 mol) of ethyl aminocrotonate (II′) was dissolved in 500 ml. of absolute alcohol and then to this solution was added 3 g. of piperidine. To this mixture obtained as above was added dropwise 67 g. (1.2 mol) of acrolein (I′) during a period of three hours with stirring and heating at a temperature between 40° C.–50° C. on water bath. After the addition was completed, the mixture was heated under reflux for about three hours on water bath. The reaction solution changed to pale brown from yellow.

Then, alcohol and piperidine were distilled out and the residue was distilled at a reduced pressure, whereby 105 g. of the compound represented by the Formula III′ and 15 g. of the compound represented by the Formula IV′ were obtained.

The properties of said former Compound III′:

Boiling point (8 mm.) _____ °C__ 128–130
Melting point (recrystallized with petroleum-
  ether) _____ °C__ 71–72

The properties of said latter Compound IV′:

Boiling point (11 mm.) _____ °C__ 103–105
Melting point of the picrate _____ °C__ 146

105 g. of the Compound III′ was dissolved in 280 ml. of ether to prepare the first solution and 116 g. of sodium nitrate was dissolved in 320 mol of water to prepare the second solution. The first and second solutions were mixed and to this mixture was gradually added 420 ml. of 20% H₂SO₄ with reflux condenser. After the addition, water layer was separated from the solution and then the water layer was extracted with ether after making the solution alkaline with a solution of caustic soda. After drying, the ether was distilled off and the residue was distilled at a reduced pressure, whereby 79 g. of the compound represented by the general Formula IV′ was obtained. Yield of the final product represented by the Formula V′ was 94 g. (79+15).

The reaction of this example is as follows:

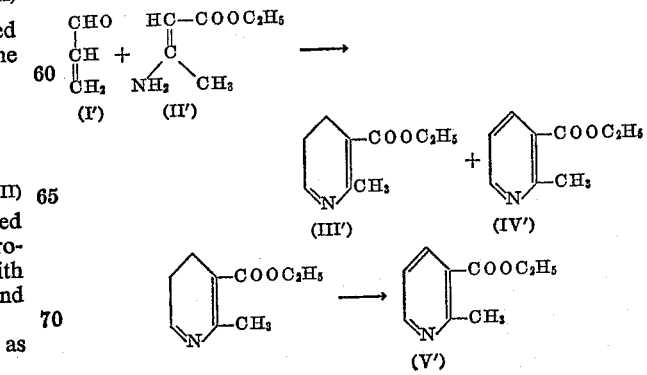

While we have described particular embodiments of our invention, it will, of course, be understood that we do not wish to be limited thereto, since many modifications may be made and we, therefore, contemplate by the appended claims to cover all such modifications as fall within the true spirit and scope of our invention:

We claim:

1. Process for the production of a pyridine compound having the formula

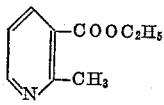

which comprises reacting acrolein with a compound having the formula

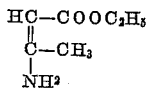

in absolute alcohol in the presence of a catalyst of piperidine, whereby a mixture of compounds having the general formulas

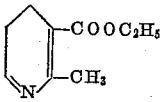

and

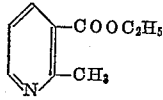

are obtained, and then oxidizing said mixture with sodium nitrate and sulfuric acid.

2. Process for the production of a pyridine compound having the general formula

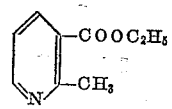

which comprises reacting acrolein with a compound having the formula

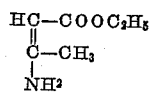

in absolute alcohol in the presence of a catalyst of piperidine whereby a mixture of the compounds having the formulas

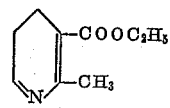

and

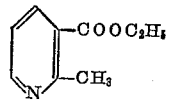

are obtained, separating the dihydro compound from said mixture, and then oxidizing said dihydro compound with sodium nitrate and sulfuric acid.

References Cited in the file of this patent
UNITED STATES PATENTS 2,520,097    Hearne et al. _____ Aug. 22, 1950
2,704,759    Gluesenkamp et al. _____ Mar. 22, 1955